2821
H. G. Arnold's Sash Lock.
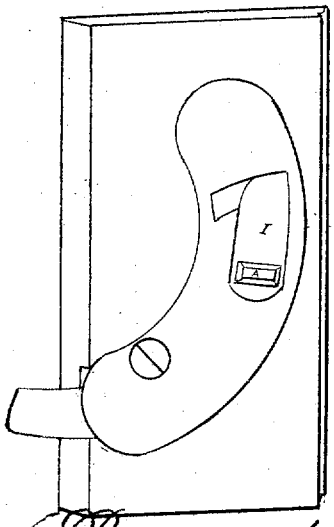
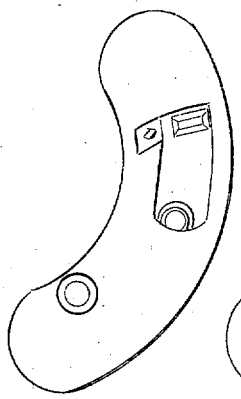
Fig. 2.
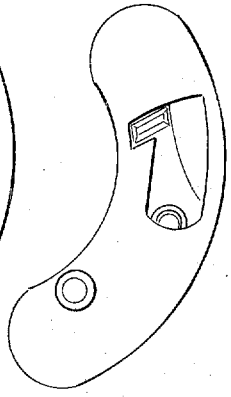
Fig. 3.
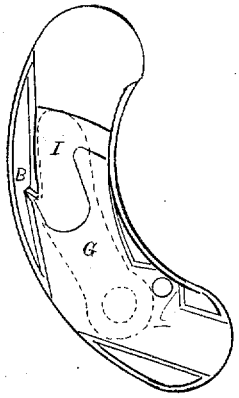
Fig. 10.
Reissued
Dec 31 1867
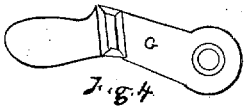
Fig. 4
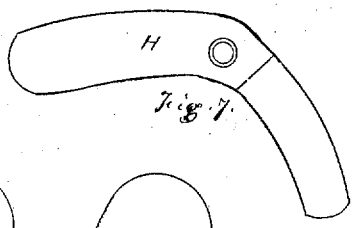
Fig. 7.
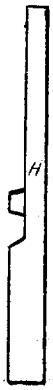
Fig. 6
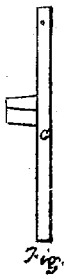
Fig. 5.
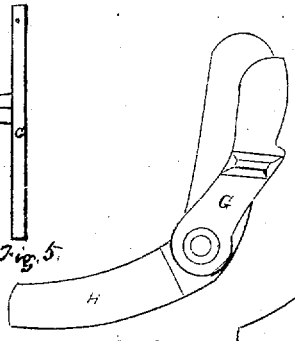
Fig. 8.
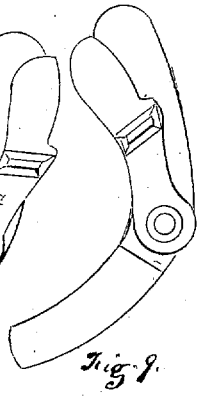
Fig. 9.
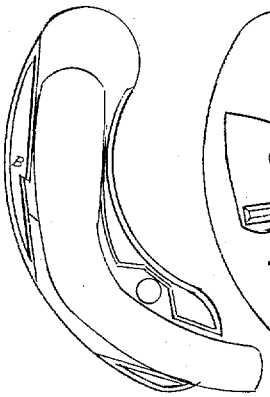
Fig. 11.
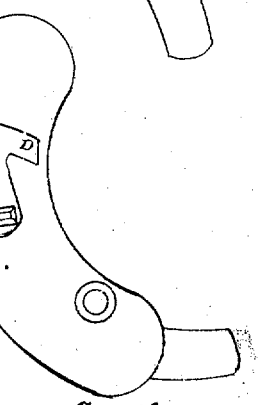
Fig. 12.
In presence of
Jeremiah Cutler
Rochester New York
Edmund Webster
Rochester N. Y.
Hobart G. Arnold

United States Patent Office.

HOBART G. ARNOLD, OF ROCHESTER, NEW YORK.

*Letters Patent No.* 69,746, *dated October* 15, 1867; *antedated September* 17, 1867; *reissue No.* 2,821, *dated December* 31, 1867.

IMPROVEMENT IN WINDOW-SASH FASTENERS.

The Schedule referred to in these Letters Patent and making part of the same.

TO ALL WHOM IT MAY CONCERN:

Be it known that I, HOBART G. ARNOLD, of Rochester, in the county of Monroe, and State of New York, have invented new and useful Improvements in a Fastener or Lock for Window-Sash, of which the following is a full and exact description, reference being had to the accompanying drawings, making part of this specification, and to the letters of reference marked thereon; and of said drawings—

Figure 1 is a perspective view of the lock as applied to the sash, and let in even with the face of it, which is the most common way of applying, with the bolt extended downward and outward, showing its position when the sash is locked. Letter I represents a slot or opening in the box for the nib A, by which the lock is worked.

Figure 2 represents the nib drawn inward, with the bolt and tumbler, hereinafter described, showing their position when the sash is unlocked. The downward motion is by their own weight.

Figure 3 represents the nib moved to the left hand, and into the notch D, which secures it in that position, leaving the sash unlocked any length of time desired.

Figure 11 is an inside view of the lock, with the bolt partly drawn up. The tumbler is between the box and bolt, so that it cannot be seen.

Figure 4 represents the tumbler by which the lock is operated, and locked upward or downward, parts of which are shown in figs. 1, 2, and 3.

Figure 5 is a lateral view of the tumbler.

Figure 7 is a separate view of the bolt.

Figure 6 is a lateral view of the same.

Figure 8 is a view of the bolt and tumbler. The latter is here let in even, but not necessarily, and they are secured together loosely by a pin.

Figure 9 represents the same drawn upwards, as shown in fig. 3.

Figure 10 is an inside view of the box.

Letter B represents the notch into which the tumbler drops when it is down, and holds it there, so that the bolt cannot be raised or moved inward by any pressure upon the outer end of it. The dotted lines here given represent the position of the tumbler G when it falls into notch B.

The nature of my invention consists in so constructing and arranging a box, bolt, and tumbler, that they may be operated by a nib or handle on the tumbler, the latter so arranged that, at the pleasure of the person operating, it may hold the bolt inward and upward, leaving the sash unlocked and free, so that both hands may be used in raising or lowering it; or it may be left in this position for any length of time desired, which is often very desirable, and particularly in weighted sash, the natural movement of the bolt and tumbler being free in their upward and downward motion the same as though they were not intended to be locked upward; also that, when desirable, the same tumbler may be made so as to lock the bolt down, as shown in fig. 10, without materially affecting the movement of the nib in its upward and downward motion by the hand or the weight of the bolt and tumbler. But as this is intended only as additional security to the bolt when locked, it is not absolutely necessary, so that the lock may be made with or without it, without affecting the validity of the patent.

To enable others skilled in the art to make and use my invention, I refer again to the drawings, which are intended to be full size, or any other size may be selected, as desired.

The bolt and tumbler should be sufficiently loose to work freely. The outside form of the box as here shown is intended for economy in manufacturing, and for convenience in applying it to the sash. By referring to fig. 8 it will be seen, as there shown, the tumbler inclines to the right, so that it is not affected by notch D, and, when down, naturally falls into notch B, holding the bolt securely against any pressure that may be brought to bear upon the outer end of it. Neither is it affected by notch B in raising it upward with the hand, provided the hand is moved perpendicularly, or nearly so; but when the nib is moved into notch D, as shown in fig 3, the tumbler inclines to the left, which, with the form of the notch, holds the bolt up, leaving the sash unfastened, so that both hands may be used in raising or lowering it; or it may be left in that position any length of time desired. It will be seen that it requires but a slight effort to move the nib A into notch D, or to remove it into its natural position, as shown in figs. 1, 2, and 8.

To make the lock for right hand, it will only be necessary to reverse the patterns accordingly, as seen in Figure 12. This arrangement allows of a longer box, better adapted to variations of the upper end, so as to accommodate the different widths of sash or thicknesses of moulding, consequently a longer and heavier bolt, giving a stronger motion downward without increasing the weight or expense of the lock. But the lock is not necessarily confined to the shape here given, but may be varied as desired.

Having thus fully described my invention and its utility, what I claim as new, and wish to secure by Letters Patent, is—

A sash-lock, composed of bolt H, tumbler G, and notched plate, the whole combined and arranged substantially as and for the purposes set forth.

HOBART G. ARNOLD.

Witnesses:
EDWARD WEBSTER,
JEREMIAH CUTLER.